June 3, 1941.　　　J. F. ANDREWS　　　2,244,041
TRANSMISSION MEASURING SYSTEM
Filed Sept. 26, 1939
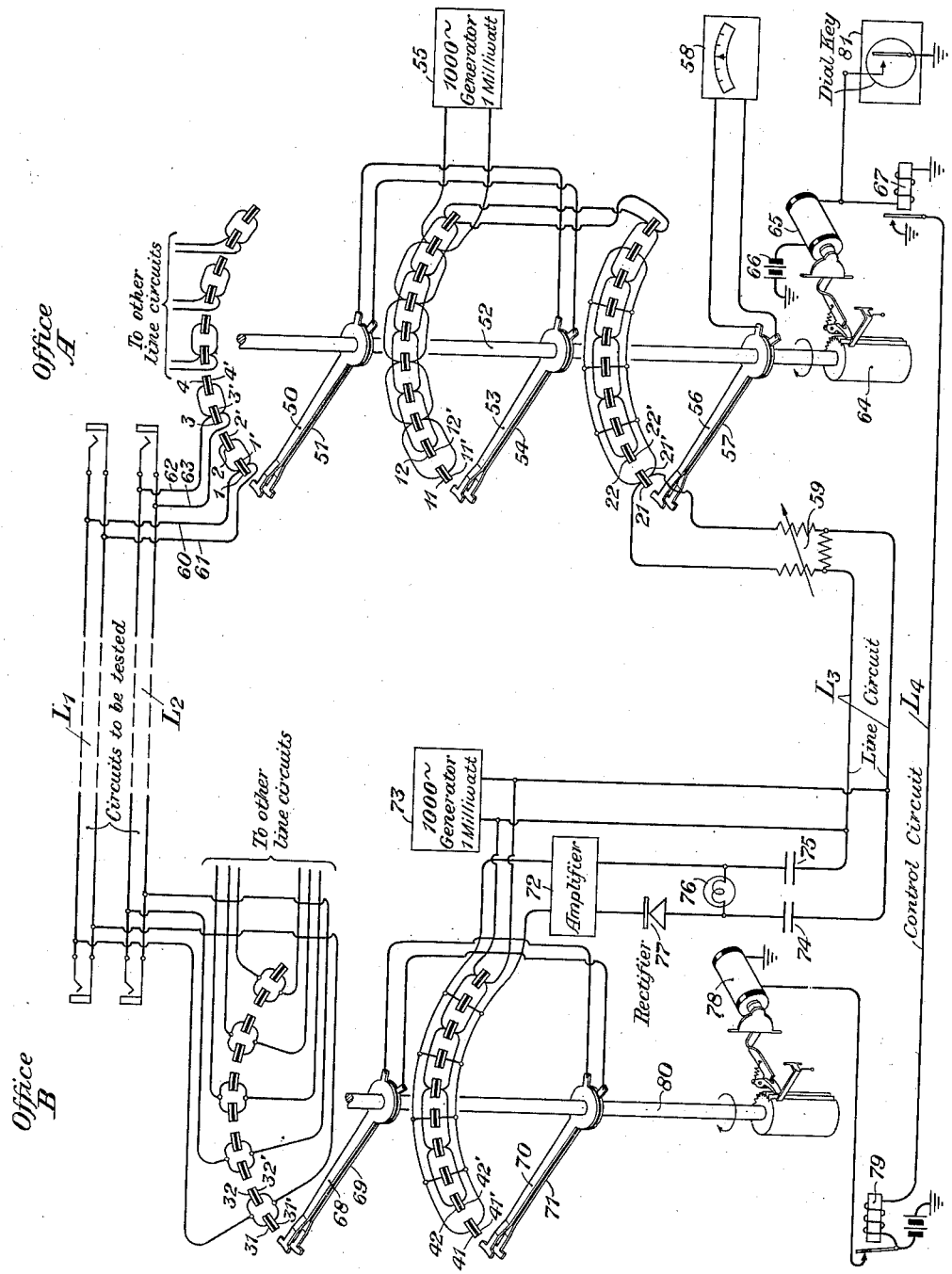
INVENTOR
J. F. Andrews
BY William R. Ballard
ATTORNEY Reissued June 3, 1941

2,244,041

UNITED STATES PATENT OFFICE 2,244,041

TRANSMISSION MEASURING SYSTEM

Joseph Frank Andrews, New York, N. Y., assignor to American Telephone and Telegraph Company, a corporation of New York Application September 26, 1939, Serial No. 296,687

12 Claims. (Cl. 179—175.3)

This invention relates to transmission measuring systems and particularly to a method and means whereby the transmission efficiency of a signaling circuit may be measured in both directions by a testman at one end of the circuit, the necessary connections at the far end being automatically made by the said testman.

Heretofore, it has been customary to test each signaling circuit, such as a toll or long distance circuit, at stated intervals of time depending upon the type of circuit, the number of tests ranging from two per week to two each year. Since each measurement requires from five to twelve minutes at each circuit terminal, and, in addition involves not only the services of the testman but also the assistance of two operators to make the circuit connections at those terminals, it is obvious that a large amount of time and labor are expended to complete the measurements in those offices where a large number of circuits terminate.

One of the objects of the present invention is to simplify the procedure required for the making of such transmission test and thereby to reduce the amount of time necessary for the making of such test.

Another object of the invention is to enable the testman to automatically select the circuits to be tested and to make the necessary connections at both ends of the selected circuit for the making of a two-way transmission test upon the selected circuit.

The manner in which those and other objects of this invention are attained will be apparent from the following description when read in connection with the attached drawing that shows schematically one form of embodiment of the invention.

In the drawing $L_1$ and $L_2$ represent two toll or long distance circuits, hereinafter referred to as signaling circuits, that extend from office A to office B. Such circuits would have at each terminal thereof the usual terminal apparatus, but for the purpose of simplicity such apparatus is omitted from the drawing since it forms no part of the invention. At office A the circuit $L_1$ is connected by the conductors 60 and 61 to the contacts 1 and 1', which contacts form part of the upper bank of contacts of the selector shown at the right-hand side of the figure. Contact 1 is connected to contact 2, and likewise contact 1' is connected to contact 2', the purpose of which will be later made clear. In like manner the circuit $L_2$ is connected by conductors 62 and 63 to contacts 3 and 3' of the same bank of contacts, which contacts are connected to contacts 4 and 4', respectively. In like manner other signaling circuits, similar to $L_1$ and $L_2$, may be connected to other pairs of contacts in the upper bank of the selector. The wiper contacts 50 and 51, which are supported by the shaft 52, are adapted to be moved by steps across the contacts, 1, 1', 2, 2' etc. whenever the shaft is rotated. The wiper contacts 50, 51 are connected to the wiper contacts 53, 54, respectively, which are adapted to be moved by steps across the contacts 11, 11', 12, 12', etc. that form part of the middle bank of contacts of the selector. The odd numbered contacts of that bank are connected together, and likewise the odd numbered primed contacts are connected together and all contacts thus connected are in turn connected to the generator 55. That generator is represented as producing 1,000 cycle current at a fixed output of one milliwatt, but, of course, other values of frequency and of power might be employed. The even numbered contacts of the middle bank and also the even numbered primed contacts of that bank are connected together, and are in turn connected to the even numbered contacts (primed and unprimed) in the lowest bank of the selector. The wiper contacts 56, 57 which are adapted to move by steps across the contacts of the lowest bank are connected to the measuring device 58. All of the odd numbered contacts of the lowest bank are connected together and likewise all of the odd numbered primed, and those contacts, thus connected, are in turn connected to the circuit $L_3$ that extends between office A and office B. The resistance network 59, which is shown between $L_3$ and the selector, furnishes the means for adjusting the deflection of the needle of the meter 58. This adjustment is necessary to compensate for variations in the net loss over the tone circuit $L_3$. The network should be adjusted to afford the proper deflection of the needle upon the scale of the meter. This adjustment should be made prior to transmitting current in either direction over circuits such as $L_1$ and $L_2$. With the generator 73 transmitting current of a definite frequency and magnitude over the circuit $L_3$, the deflection of the needle would be properly positioned, say at zero, by suitable adjustment of the network 59.

The shaft 52 of the selector at office A is adapted to be rotated by means of the arrangement shown at the bottom thereof. This comprises a ratchet cylinder 64 which is attached to the shaft and may be rotated one step at a time, by the operation of the magnet 65. That magnet winding is connected in series with the battery 66 and the winding of the relay 67. A dial key 81 serves to operate the device.

The selector may be of the type shown in Fig. 380 upon page 516 of "Telephony" by McMeen and Miller (1912 edition). As there shown the device is arranged also to elevate the shaft vertically so that each set of wiper contacts might cover more than one bank of fixed contacts, but for the sake of simplicity such elevating mechanism has been omitted from the applicant's drawing.

At the distant office B another similar selector is employed. The adjacent contacts 31 and 32 of the upper bank are connected together, and similarly connected are the contacts 31' and 32'. Each pair thus connected is in turn connected to one of the circuits $L_1$ and $L_2$; and as shown on the drawing, other pairs of connected contacts of that bank may be connected to other signaling circuits. The wiper arms 68, 69 that move across the upper bank of contacts are connected to the wiper arms 70, 71 respectively, that move across the contacts of the lower bank of the selector. The odd numbered contacts of the lower bank are connected together, and the odd numbered primed contacts likewise are connected together. And those contacts are connected to the input side of the amplifier 72. The even numbered contacts of that bank, and likewise the even numbered primed are connected to the generator 73 which, for the purpose of illustration, is indicated as producing one milliwatt of power at 1,000 cycles. The generator is also connected to the circuit $L_3$, and at the point of its connection to the circuit $L_3$, an impedance is shunted thereacross. That impedance is represented by the condensers 74 and 75 and an element 76 whose resistance varies with the amount of current passing therethrough. The element may be a boron or uranium oxide bead, and, as shown in the drawing, the element is connected in the output circuit of the amplifier 72 in series with the rectifier 77, so that its resistance is responsive to the output current of the amplifier. The selector at office B is stepped around by the magnet 78 which is connected to the back contact of the relay 79. The winding of the latter relay is connected to the circuit $L_4$, which, for example, may be a telegraph circuit extending between office A and office B.

The manner in which the transmission efficiency of the line $L_1$ is determined is as follows: The testman at office A operates the dial key 81 which energizes the magnet 65 sufficiently to attract its armature and thereby to effect the rotation of the shaft 52 one step. That brings all of the wiper contacts upon the first fixed contacts of their respective banks. Furthermore, by the operation of the dial key 81 relay 67 becomes deenergized, and, upon the release of its armature, relay 79 at the distant office is energized. That removes the battery from the magnet 78 and results in the rotation of the shaft 80 one step, thereby bringing the wiper contacts of that selector into engagement with the first contacts of their respective banks. With the circuit thus arranged current will flow from the generator 55 over a circuit that includes the odd numbered contacts of the middle bank of contacts, arms 53 and 59, contact 1, the upper conductor of circuit $L_1$, contact 31 of the upper bank at office B, arms 68 and 70, the odd numbered contacts of the lower bank to one terminal of the input side of amplifier 72, thence from the other terminal of the input side to contact 41', wiper contacts 71 and 69, contact 31', the lower conductor of circuit $L_1$, conductor 61, contact 1', wiper contacts 51 and 54 and the odd numbered primed contacts of the middle bank of contacts at office A to the other side of the generator 55. Simultaneous with the transmission of the current over the line $L_1$ current will be transmitted from generator 73 at office B over the circuit $L_3$ to the measuring device 58 which is connected to the wiper contacts 56 and 57, which rest upon the contacts 21 and 21' of the lowest bank of contacts of that selector. The output of the generator 73 is shunted by the impedance 74, 75, 76. As long as that impedance remains fixed the magnitude of the current transmitted over the line $L_3$ from 73 will likewise remain fixed. However, as pointed out hereinbefore, the magnitude of the impedance 74, 75, 76 is susceptible of variation due to the effect of the rectified current impressed thereon by the amplifier 72, which current depends, in magnitude, upon the amount of current received from the circuit $L_1$. As the element 76 varies in resistance due to changes in the amount of current received at office B over the circuit $L_1$, the amount of current sent over the circuit $L_3$ from the generator 73 will vary from normal and such variation will be shown upon the measuring device 58. Those variations are a measure of the transmission efficiency of the circuit $L_1$ when transmitting in the direction from office A to office B.

Upon the completion of the making of that measurement the circuit is then arranged to measure the transmission efficiency in the opposite direction, i. e. from office B to office A. This is accomplished by another operation of the key 81 by the testman at office A. That operation causes the wiper contacts of the selectors at office A and office B to move one step in the direction of rotation. The effect of that at office A is to disconnect generator 55 from the circuit $L_1$ and to connect thereto the measuring device 58, thereby making possible the measurement of current transmitted from the distant end of $L_2$. The connection is established in the following manner. When the wiper contacts 50 and 51 rest upon the contacts 2 and 2', the circuit $L_1$ will be connected to the wiper contacts 53, 54 which rest upon contacts 12 and 12'. The even numbered contacts of the middle bank are connected to the even numbered contacts of the lowest bank of that selector. Since the wiper contacts 56 and 57 are at that instant resting upon contacts 22 and 22' of the lowest bank, the measuring device 58 will, therefore, be connected to the circuit $L_1$.

At the distant office B the wiper contacts are likewise upon the second contacts of each bank of contacts. Accordingly the distant end of circuit $L_1$ which is connected to the fixed contacts 32 and 32' will be connected therethrough to the wiper contacts 68 and 69, which are in turn connected to the wiper contacts 70 and 71 which rest upon fixed contacts 42 and 42'. The latter contacts are connected to the output side of generator 73 so that current from that generator will be transmitted over the circuit just traced to the terminal of the circuit $L_1$ at office B. The current or power transmitted over circuit $L_1$ will be measured by the device 58, and such reading is a measurement of the efficiency of that circuit in transmitting in the direction from office B to office A. If the testing of other circuits is unnecessary or undesired a clearing out signal may be sent by means of the dial key 81 to disconnect the measuring apparatus by rapidly stepping around the selector switches at the several offices. If, however, it is desired to test other circuits, the procedure is as follows:

Upon the completion of the making of the two-way measurements of the transmission efficiency of the circuit $L_1$ in the manner above described the testman again operates the key 81. That causes the selectors at office A and office B to move another step in the direction of rotation which brings the wiper contacts upon the third contacts on each bank of the several selectors. That serves to connect generator 55 at office A to the circuit $L_2$ for the purpose of measuring the transmission efficiency of that circuit in the direction from office A to office B. Upon the completion of the making of that measurement the key 81 is again operated, which causes both selectors to move another step forward, and the apparatus is then connected to measure the transmission efficiency of the circuit $L_2$ in the direction from office B to office A.

By means of the system hereinbefore described transmission measurements in both directions upon a given circuit may be quickly made by a one testman operating at one end of the circuit. Such system not only greatly reduces the amount of time heretofore required in the making of such test, but also reduces greatly the amount of labor required and thereby reduces the cost of making such tests.

While this invention has been disclosed as embodied in a particular form, it is capable of embodiment in other and different forms without departing from the spirit and scope of the appended claims.

What is claimed is:

1. In a transmission measuring system the combination with a signaling circuit, whose transmission efficiency is to be measured between two terminals thereof, of a source of current of fixed magnitude connected to the near end of said circuit, a second circuit coterminous with the said first mentioned circuit and having a source of current of fixed magnitude connected thereto at its distant end and a current measuring instrument connected thereto at its near end, a shunt connected across said second circuit at its distant end and means responsive to the current in the said first mentioned circuit to vary the conductivity of the said shunt whereby the magnitude of the current flowing through the said second circuit is proportional to and a measure of the transmission efficiency of the said first mentioned circuit.

2. In a transmission measuring system, the combination with a signaling circuit, whose transmission efficiency is to be measured, of a source of current of fixed magnitude, switching means to connect said source to the near end of said circuit, an amplifier, a second switching means to connect the far end of said circuit to the said amplifier, a second circuit coterminous with the said first mentioned circuit and having a source of current of fixed magnitude connected across the far end thereof, a shunt connected also across the far end of the said second circuit, the said shunt being connected to the output of the said amplifier, and including an impedance whose conductivity varies with the strength of the output current of the said amplifier, a current measuring device and switching means to connect the said measuring device to the near end of either the said second circuit or the said signaling circuit.

3. In a transmission measuring system, the combination with a signaling circuit, the transmission efficiency of which is to be measured, of a source of current adapted to be connected to the said signaling circuit, a second circuit coterminous with the said signaling circuit, a second source of current connected to the distant end of the said second circuit, a device for measuring the current transmitted over the said second circuit, and means controlled by the current transmitted over the said signaling circuit to vary the magnitude of the current transmitted over the said second circuit.

4. In a transmission measuring system, the combination with a signaling circuit, the transmission efficiency of which is to be measured, of a source of current to be transmitted over the said signaling circuit, switching means to connect the said source to the said signaling circuit, a second circuit coterminous with the said signaling circuit, a second source of current connected to the said second circuit for transmission thereover, a current measuring device adapted to be connected to the said second circuit, and a controllable impedance adapted to be connected across the output of the said second source of current and responsive to the current being transmitted over the said signaling circuit to render the magnitude of the current being transmitted over the said second circuit proportional to the magnitude of the received current in the said signaling circuit.

5. In a transmission measuring system, the combination with a signaling circuit, the transmission efficiency of which is to be measured of a second circuit, coterminous with the said signaling circuit, a source of current of fixed magnitude for connection with the said signaling circuit at the near end, a current meter for connection with each circuit alternately, switching means controllable at will to simultaneously connect said source of current to said signaling circuit and said meter to said second circuit, or to disconnect said meter from the said second circuit and connect said meter to said signaling circuit whenever said source of current is disconnected therefrom, and a second source of current connected to the distant end of said second circuit but adapted also for connection to the distant end of the said signaling circuit, a controllable impedance connected across the distant end of said second circuit and arranged to shunt a portion of the current from the said second source and a second switching means at the far end to alternately connect the signaling circuit to the said controllable impedance or to connect the said second source of current to the far end of said signaling circuit.

6. The method of measuring the transmission efficiency of a signaling circuit which consists in applying to that circuit a fixed amount of power, simultaneously applying power to the distant end of a second circuit, coterminous with the said first circuit and measuring the amount of power received at the near end of said second circuit, and controlling the amount of power applied to the distant end of the said second circuit by and in accordance with the amount of power received at the distant end of the said signaling circuit.

7. The method of measuring the transmission efficiency of a signaling circuit which consists in applying a known amount of power to the near end of the signaling circuit and controlling by the amount of power received at the distant end of that circuit the amount of power that may be transmitted over another circuit from the distant end thereof, the said other circuit being coterminous with the said signaling circuit, and measuring the amount of current received at the near end of said other circuit.

8. The method of measuring the transmission efficiency of a signaling circuit, which consists in applying a known amount of power to the near end of the signaling circuit, rectifying the current received at the far end of the said signaling circuit and utilizing that rectified current to control the magnitude of the current transmitted from the distant end of a second circuit, coterminous with the said signaling circuit, and measuring the amount of current received at the near end of the said second circuit.

9. The method of measuring the transmission efficiency of a signaling circuit, which consists in applying a known amount of power to the near end of the signaling circuit, simultaneously applying power to the far end of a second circuit coterminous with the said signaling circuit, varying the amount of power applied to the said second circuit by and in accordance with the amount of power received at the distant end of the said signaling circuit and measuring the amount of power received at the near end of the said second circuit.

10. The method of claim 9 further characterized by the discontinuance of the application of power at the near end of the signaling circuit and by the application of power to the far end of that circuit and the measurement of the power received at the near end of such circuit.

11. In a transmission measuring system, the combination with a signaling circuit, whose transmission efficiency is to be measured, of a second circuit coterminous with the said signaling circuit, a source of current of fixed magnitude, a current measuring device, both located at the near ends of said circuits, a second source of current of fixed magnitude connected to the distant end of said second circuit, the said connection being shunted by an impedance adapted to be varied, an amplifier having a rectifier connected to the output side thereof, an impedance also connected to the output of said amplifiers, switching means at the near end arranged to connect said first mentioned source to said signaling circuit and said measuring device to said second circuit and a second switching means at the distant end to connect that end of said signaling circuit to the input side of the said amplifier.

12. The arrangement of claim 11 characterized by means to control the several switching means whereby the source of current at the near end may be disconnected from said signaling circuit and the said measuring device may be connected thereto, and simultaneously the distant terminal of said signaling circuit may be disconnected from the said amplifier and connected to the said second source of current thereby transmitting current over the said signaling circuit in the direction opposite to that in which it was transmitted theretofore.

JOSEPH F. ANDREWS.